United States Patent
Ouchiyama et al.

(10) Patent No.: US 6,362,853 B1
(45) Date of Patent: Mar. 26, 2002

(54) METHOD AND APPARATUS FOR DISPLAYING IMAGES

(75) Inventors: Motoki Ouchiyama, Tokyo; Hiroshi Yamashita, Kanagawa; Motosuke Irie, Chiba; Satoru Suzuki, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/297,449

(22) PCT Filed: Sep. 4, 1998

(86) PCT No.: PCT/JP98/03968

§ 371 Date: Sep. 14, 1999

§ 102(e) Date: Sep. 14, 1999

(87) PCT Pub. No.: WO99/13450

PCT Pub. Date: Mar. 18, 1999

(30) Foreign Application Priority Data

Sep. 5, 1997 (JP) ............................................. 9-257634

(51) Int. Cl.[7] .................................................. H04N 5/46
(52) U.S. Cl. ........................ 348/556; 348/555; 345/699
(58) Field of Search .................................. 348/558, 554, 348/555, 556, 551, 704, 445, 449; 345/718, 10, 11, 667, 698, 764, 699; H04N 5/46

(56) References Cited

U.S. PATENT DOCUMENTS

| 5,748,257 | A | * | 5/1998 | Kawabata et al. | 348/615 |
| 5,767,916 | A | * | 6/1998 | Gornstein et al. | 348/543 |
| 5,781,185 | A | * | 7/1998 | Shin | 348/542 |
| 5,812,210 | A | * | 9/1998 | Arai et al. | 348/555 |
| 5,986,636 | A | * | 11/1999 | Wu | 345/132 |

FOREIGN PATENT DOCUMENTS

| JP | 6126083 | 2/1986 |
| JP | 6291991 | 4/1987 |
| JP | 5300480 | 11/1993 |
| JP | 7210107 | 8/1995 |
| JP | 7303242 | 11/1995 |
| JP | 887240 | 4/1996 |
| JP | 8317313 | 11/1996 |

* cited by examiner

Primary Examiner—Michael Lee
(74) Attorney, Agent, or Firm—Jay H. Maioli

(57) ABSTRACT

To provide a method and device for picture display capable of performing suitable picture display corresponding to various video signals. Kind of an input video signal S1 is determined based on prestored characteristic information on video signals, and the input video signal S1 is displayed in picture according to the characteristic information based on the above determined result, so that a suitable displayed picture can be obtained corresponding to the input video signal 1.

14 Claims, 7 Drawing Sheets

| Timing | Fh(kHz) | Fv(Hz) | 1024~1100(line) | 5:4 SIGNAL |
|---|---|---|---|---|
| VGA(640×480/60Hz) | 31.47 | 59.94 | | |
| VESA(640×480/75Hz) | 37.5 | 75 | | |
| VESA(800×600/60Hz) | 37.88 | 60.32 | | |
| VESA(800×600/75Hz) | 46.88 | 75 | | |
| VESA(1024×768/60Hz) | 48.36 | 60 | | |
| SGI(1024×768/60Hz) | 48.73 | 59.94 | | |
| VESA(800×600/85Hz) | 53.67 | 85.06 | | |
| VESA(1024×768/75Hz) | 56.48 | 70.07 | | |
| VESA(1280×960/60Hz) | 60 | 60 | | |
| VESA(1024×768/75Hz) | 60.02 | 75.03 | | |
| VESA(1280×1024/60Hz) | 63.98 | 60.02 | ○ | ○ |
| VESA(1152×864/75Hz) | 67.5 | 75 | | |
| VESA(1024×768/85Hz) | 68.68 | 85 | | |
| VESA(1280×1024/75Hz) | 79.98 | 75.02 | ○ | ○ |
| VESA(1600×1200/65Hz) | 81.25 | 65 | | |
| VESA(1600×1200/70Hz) | 87.5 | 70 | | |
| VESA(1280×960/85Hz) | 85.94 | 85 | | |
| VESA(1280×1024/85Hz) | 91.15 | 85.02 | ○ | ○ |

FIG. 6

METHOD AND APPARATUS FOR DISPLAYING IMAGES

FIELD OF THE ART

The present invention relates to a method and device for picture display, and is applicable to, for example, a method and device for picture display when a video signal gene rated or processed by a computer is displayed at an aspect ratio adapted for each frame.

BACKGROUND ART

For example, there are various video signals which have generated or processed by computers in which the polar or frequency or the like of its horizontal synchronizing signal is different. A display for displaying them (cathode-ray tube etc.) is needed to display them in proper size (size and aspect ratio) and at proper display position if any video signal is inputted.

However, kinds of the video signals generated or processed by computers and video signals obtained from other video sources runs to a huge number corresponding to, e.g., horizontal synchronizing frequency, vertical synchronizing frequency, the number of horizontal lines or the like. Therefore, it is difficult to store data to set a display position and display size on a display with respect to all the supposed video signals in a storage means.

DISCLOSURE OF INVENTION

Considering the above point, the present invention provides a method and device for picture display capable of easily performing suitable picture display corresponding to various video signals.

To solve the above problem, in the present invention, kind of an input video signal is determined based on prestored characteristic information on video signals, and the input video signal is displayed in picture on a specified display means according to the characteristic information based on the above determined result. Thus, a displayed picture corresponding to the characteristic of the input video signal can be obtained.

BRIEF DESCRIPTION OF DRAWINGS

FIG. 6 is a schematic diagram explaining the determined results of aspect ratio.

BEST MODE FOR CARRYING OUT THE INVENTION

An embodiment of the present invention will be described in detail with reference to the accompanying drawings.

Figure 1:
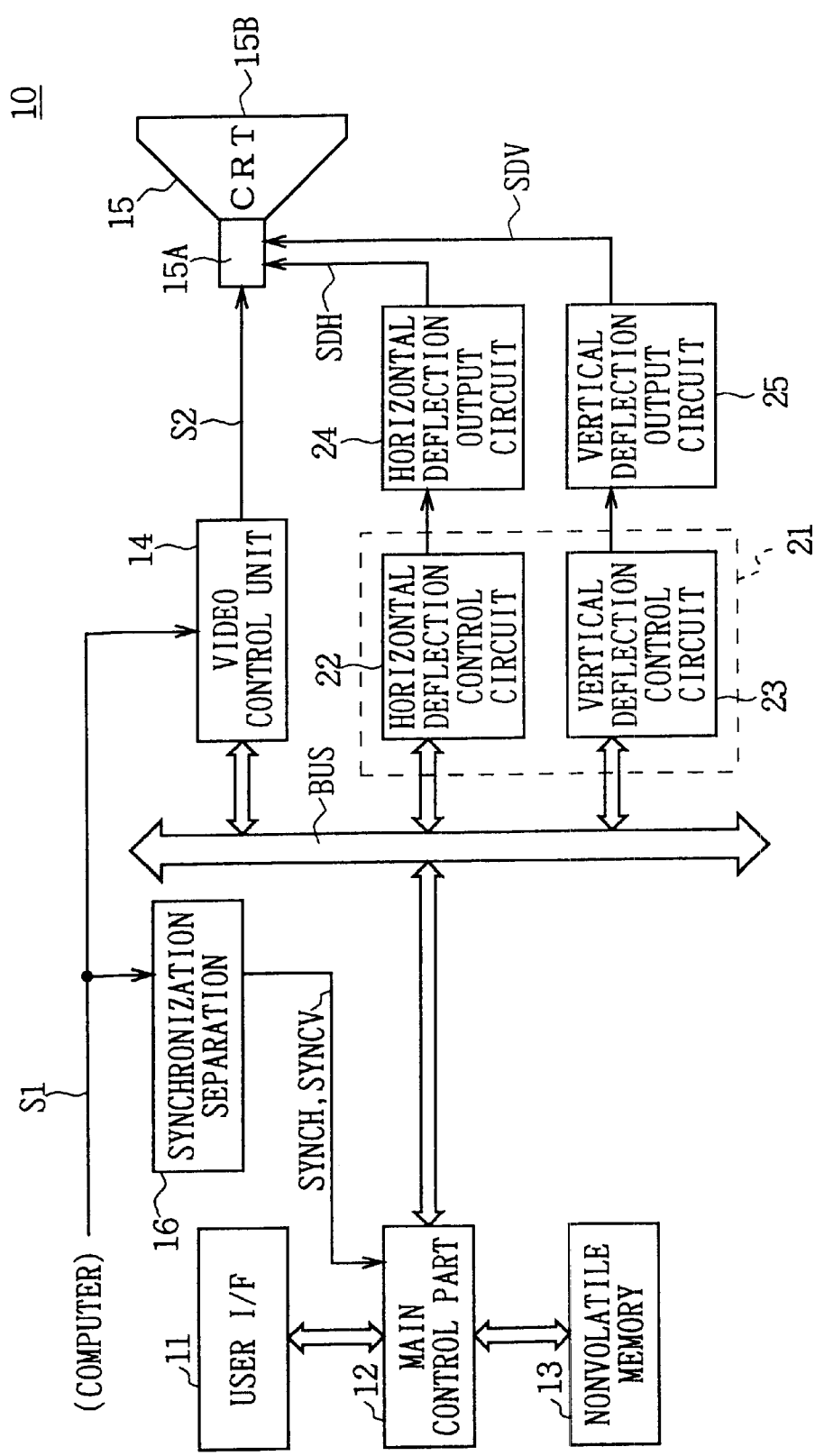
FIG. 1 is a block diagram showing the general configuration of a video display device according to the present invention.

Referring to FIG. 1, 10 generally shows a display device. A video signal S1 outputted from a video source such as a computer is inputted to a video control circuit 14. The video control circuit 14 generates an RGB video signal S2 by performing prescribed signal processing to the video signal S1 based on control data supplied from a main control part 12 via a system bus BUS, and supplies this to a CRT 15.

The video signal S1 obtained from the computer or the like is inputted to a synchronization separating circuit 16. The synchronization separating circuit 16 separates a horizontal synchronizing signal SYNCH and a vertical synchronizing signal SYNCV from the video signal S1 and transmits them to the main control part 12. The main control part 12 controls the horizontal deflection control circuit 22 and the vertical deflection control circuit 23 of a deflection control part 21 at a timing based on the horizontal synchronizing signal SYNCH and vertical synchronizing signal SYNCV, so that a horizontal deflection driving signal SDH and a vertical deflection drive signal SDV in pulse synchronized to the video signal S1 are transmitted from a horizontal deflection output circuit 24 and a vertical deflection output circuit 25 to the deflecting part 15A of the CRT 15. Thereby, a sawtooth deflected drive waveform is generated in the deflection part 15A, and a picture based on the RGB video signal S2 is displayed on the screen 15B of the CRT 15.

Prescribed setting data has been stored in a nonvolatile memory 13 in the final adjustment process in the manufacturing process of the display device 10 including the CRT 15, so that a video signal to be inputted when the above display device 10 is used can be displayed here in a proper display size and at a proper display position corresponding to the kind (aspect ratio) of the above video signal on the screen 15B of the CRT 15.

Figure 2:
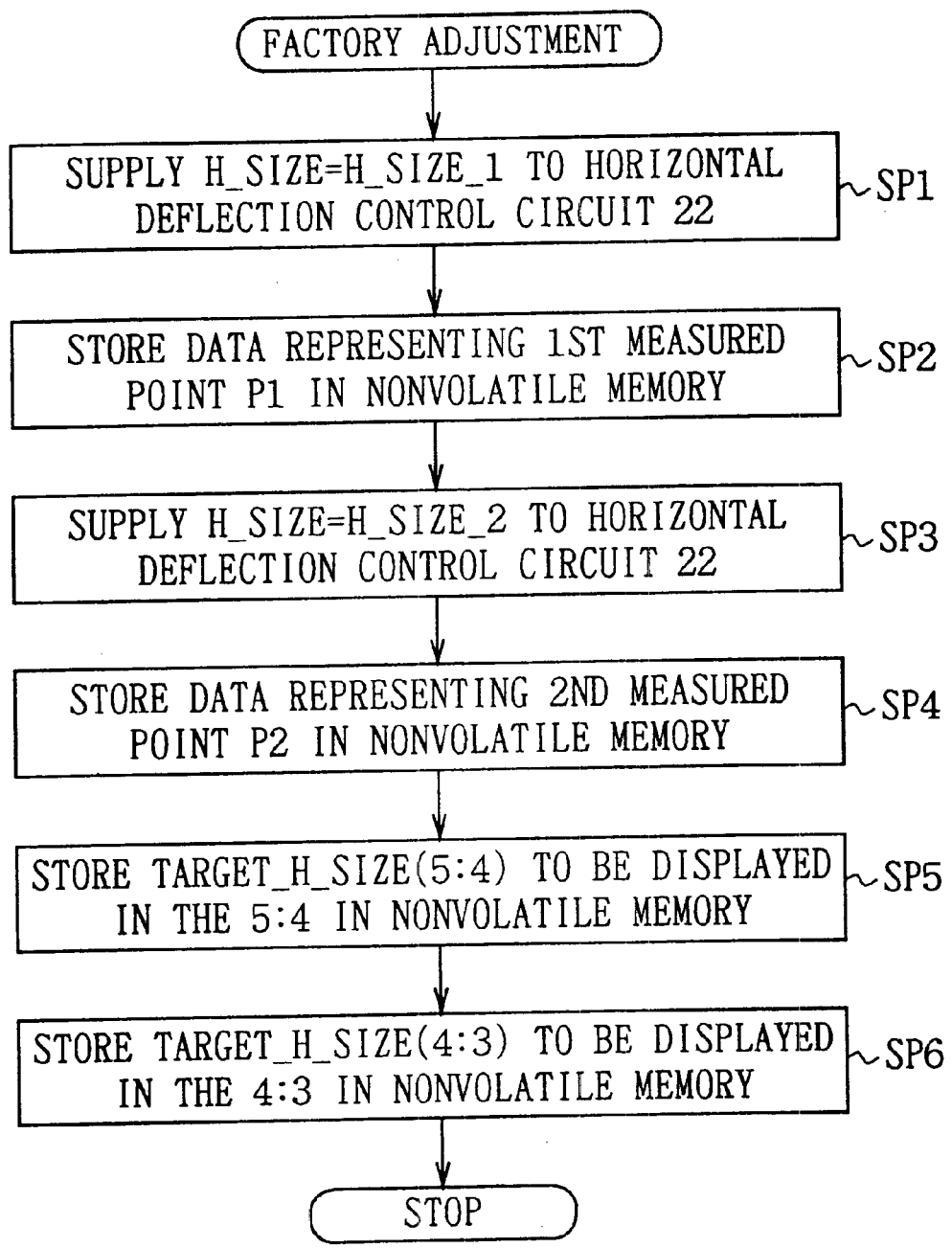
FIG. 2 is a flowchart showing an adjustment procedure in factory forwarding according to the present invention.

In this factory adjustment process, as shown in FIG. 2, first in step SP1, setting data peculiar to the CRT 15 which is necessary for adjusting a picture size in user use is obtained. That is, in the above step SP1, adjustment video signal (active ratio has known previously) is inputted to the display device 10, and the horizontal display size of a picture to be actually displayed on the screen 15B of the CRT 15 is measured based on the above adjustment video signal.

In this connection, in the display device 10, the control voltage of the voltage-controlled oscillator (VCO) of the horizontal deflection control circuit 22 is set by 8-bit horizontal deflection size data (H_SIZE data) outputted from the main control part 12 via the system bus BUS, and the oscillated output of the above VCO is supplied to the horizontal deflection output circuit 24 (FIG. 1), so that the pulse horizontal deflection drive signal SDH corresponding to the frequency is outputted. In this embodiment, in the deflection part 15A of tile CRT 15, if tile horizontal deflection size data (H_SIZE data) to be outputted from the main control part 12, i.e., the horizontal deflection drive signal SDH is the same, a uniform horizontal raster size can be obtained irrespective of the frequency of a video signal.

Figure 3:
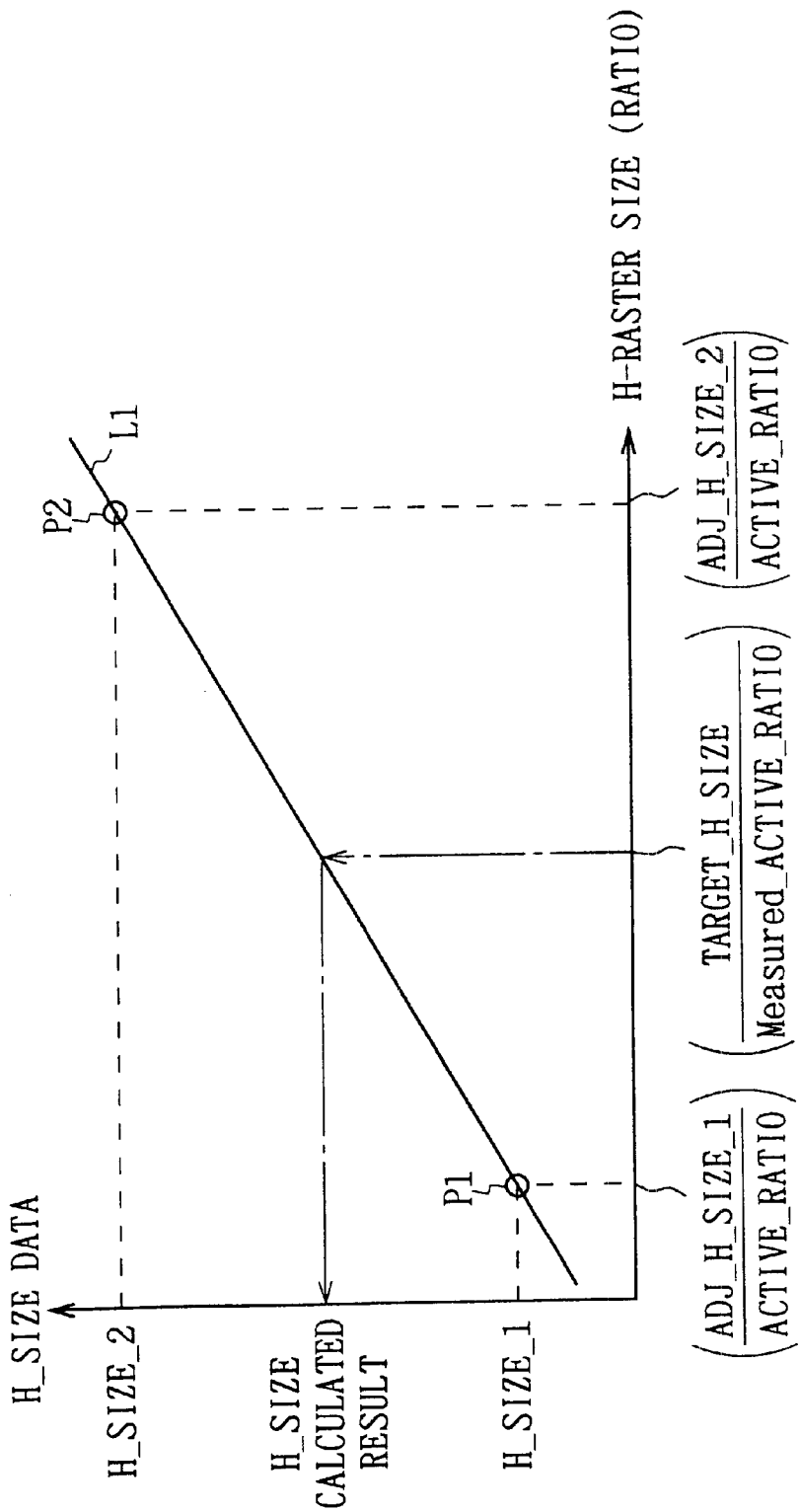
FIG. 3 is a schematic diagram explaining the construction of EPG data.

Therefore, in step SP1 of FIG. 2, the horizontal display size of the picture to be actually displayed on the screen 15B of the CRT 15 is measured, and the main control part 12 adjusts H_SIZE so that this horizontal display size becomes a first position ADJ_H_SIZE_1, and supplies it to the horizontal deflection control circuit 22. Here, H_SIZE when the horizontal display size is to be ADJ_H_SIZE_1 as a result of the adjustment is assumed as H_SIZE_1 (FIG. 3). Furthermore, the active ratio ACTIVE RATIO of the adjustment video signal is previously known, and a value by that the horizontal display size ADJ_H_SIZE_1 is divided into the active ratio ACTIVE RATIO (ADJ_H_SIZE_1/ (ACTIVE RATIO)) becomes the size of the actual horizontal deflection scanning (horizontal raster size), provided that the horizontal axis of FIG. 3 is the result by dividing the horizontal display size ADJ_H_SIZE_1 into the active ratio ACTIVE RATIO, and it shows a ratio.

Figure 4:
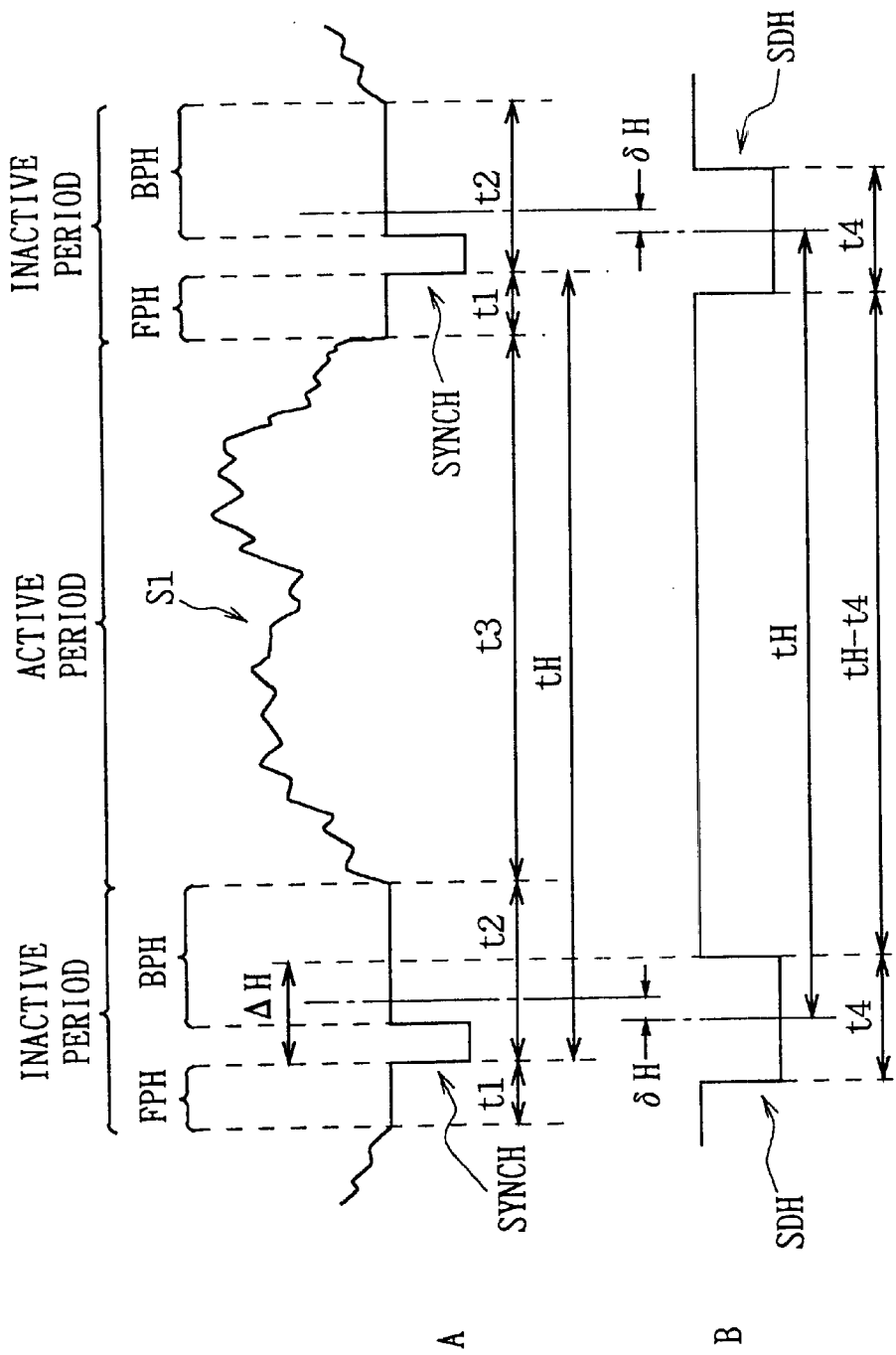
FIGS. 4A and 4B are schematic diagrams explaining the construction of program content data in the EPG data of FIG. 3.

In this connection, FIG. 4A shows the video signal S1 including the horizontal synchronizing signal SYNCH, and FIG. 4B shows the timing of the horizontal deflection drive signal SDH to be outputted from the horizontal deflection output circuit 24 to the CRT 15. Horizontal timing data t1 in FIG. 4A is data which represents the length of the front porch FPH of the horizontal synchronizing signal SYNCH, and horizontal timing data t2 is data which represents the length of the horizontal synchronizing signal SYNCH and a back porch BPH following that combined. Horizontal timing data t3 is data which represents an active period between the back porch BPH and the front porch FPH, i.e., the length of the real image part of the video signal S1. This active period corresponds to the width of a video area (horizontal display size) in the both directions (horizontal direction) of the screen of the CRT 15. The period of the front porch FPH, horizontal synchronizing signal SYNCH and back porch BPH (t1+t2) is referred to as horizontal inactive period. Note that, the cycle tH (=t1+t2+t3) of the horizontal synchronizing signal SYNCH is a value determined from the frequency of the horizontal synchronizing signal.

FIG. 4A shows the horizontal deflection drive signal (horizontal deflection pulse) SDH. The above horizontal deflection drive signal (horizontal deflection pulse) SDH has a constant pulse width t4, and its cycle is set to be equal to the cycle tH of the horizontal synchronizing signal SYNCH. Therefore, the active ratio (ACTIVE RATIO) of the video signal S1 is represented by t3/(tH−t4), i.e., t3/(t1+t2+t3−t4).

In this connection, the phase of the horizontal deflection drive signal (horizontal deflection pulse) SDH shown in FIG. 4B is set to deviate δH from the video signal S1 considering a delay characteristic had in a horizontal deflection yoke. Specifically, it is set so that the amount of offset δH exists between the center of the inactive period of the video signal S1 and the center of the pulse width of the horizontal deflection drive signal (horizontal deflection pulse). If this amount of offset δH is proper, the center of the horizontal active period ACTH of the video signal S1 coincides with the center of the pulse interval of the horizontal deflection drive signal (horizontal deflection pulse) SDH. This coincidence state is ideal to make the center of screen coincident with the center of picture display area. From the reason that this amount of offset δH depends on the size of the horizontal synchronizing frequency, in the above display device 10, a horizontal offset ratio being the ratio of the amount of horizontal offset δH to the horizontal cycle tH is previously obtained by previously inputting the adjustment video signal in its forwarding adjustment to adjust the video display position corresponding to the kind of the video signal S1 (according to horizontal synchronizing frequency or the like) to be actually inputted when used by the user.

Referring to FIG. 3, if a first measured point P1 which represents the relationship between the first horizontal deflection size data (H_SIZE_1) and a horizontal raster size corresponding to the above first horizontal deflection size data (H_SIZE_1) is obtained, data representing the above first measured point P1 (combination of the first horizontal deflection size data (H_SIZE_1) and the horizontal raster size corresponding to the above first horizontal deflection size data (H_SIZE_1)) is stored in the nonvolatile memory 13 in step SP2 of FIG. 2.

Furthermore, by the similar manner, if a second measured point P2 which represents the relationship between a second horizontal deflection size data (H_SIZE_2) and a horizontal raster size corresponding to the above second horizontal deflection size data (H_SIZE_2) is obtained (step SP3), data representing the above second measured point P2 (combination of the second horizontal deflection size data (H_SIZE_2) and the horizontal raster size corresponding to the above second horizontal deflection size data (H_SIZE_2)) is stored in the nonvolatile memory 13 (step SP4).

Thereby, an interpolating line L1 (FIG. 3) is obtained from the two measured points P1 and P2, and a horizontal deflection size data (H_SIZE (calculated result)) which can obtain a horizontal raster size corresponding to the actual input video signal S1 based on the above interpolating line L1 when used by the user can be obtained.

Thus, if the data on the measured points P1 and P2 are stored in the nonvolatile memory 13, in step SP5 of FIG. 2, a horizontal display size (TARGET_H_SIZE (5:4)) when a picture is displayed on the screen 15B of the CRT 15 at the 5:4 aspect ratio is stored in the nonvolatile memory 13. When a picture based on the video signal is displayed on the screen 15B of the CRT 15, for the purpose of most effectively using the screen 15B without changing its aspect ratio, in the case where when the picture is displayed so that the vertical size of the screen 15B of the CRT 15 coincides with the vertical size of the display picture, this horizontal display size (TARGET_H_SIZE (5:4)) is a picture display size in the horizontal direction in which the aspect ratio of the above displayed picture becomes 5:4 and the aspect ratio of the input video signal S1 is 5:4 when used by the user, proper horizontal deflection can be performed corresponding to the aspect ratio of the input video signal S1 by using the data of this horizontal display size (TARGET_H_SIZE (5:4)).

In this way, if the data of the horizontal display size (TARGET_H_SIZE (5:4)) when the aspect ratio is 5:4 is stored in the nonvolatile memory 13 in step SP5 of FIG. 2, it proceeds to step SP6 to store a horizontal display size (TARGET_H_SIZE (4:3)) when the picture is displayed on the screen 15B of the CRT 15 at the aspect ratio 4:3 in the nonvolatile memory 13.

When a picture based on the video signal is displayed on the screen 15B of the CRT 15, for the purpose of most effectively using the screen 15B without changing its aspect ratio, in the case where when the picture is displayed so that the vertical size of the screen 15B of the CRT 15 and the vertical size of the displayed picture coincide, this horizontal display size (TARGET_H_SIZE (4:3)) is the picture display size in the horizontal direction in which the aspect ratio of the above displayed picture is 4:3 and the aspect ratio of the input video signal S1 is 4:3 when used by the user, and proper horizontal deflection can be performed corresponding to the aspect ratio of the input video signal S1 by using the data of this horizontal display size (TARGET_H_SIZE (4:3)).

As the factory adjustment processing shown in FIG. 2 is thus completed, the measured data P1 and P2 for obtaining the interpolating line L1 shown in FIG. 3, the horizontal display size when the picture is displayed on the screen 15B of the CRT 15 at the 5:4 and the horizontal display size when displayed at the 4:3 are stored in the nonvolatile memory 13. Thereby, in user use, control to perform deflecting operation corresponding to the kind of the input video signal S1 (i.e., aspect ratio) is executed based on these data.

Figure 5:
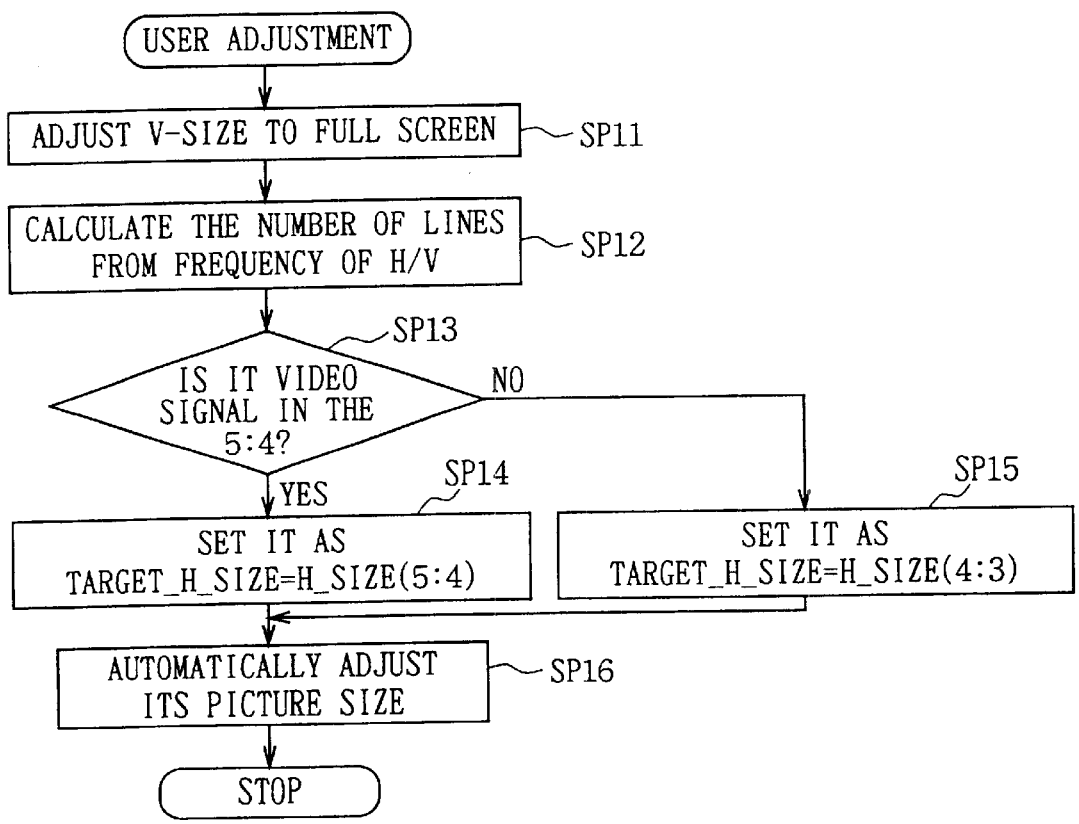
FIG. 5 is a flowchart showing a display adjustment procedure in user use.

FIG. 5 shows a display adjustment process on the input video signal S1 in user use. If an adjustment command from the user is inputted via a user interface (I/F) 11, the main control part 12 described in the above accompanying with FIG. 1 enters into the above adjustment process. In step SP11, the main control part 12 first controls a vertical deflection control circuit 25 to perform deflecting operation in which the size in the vertical direction of the displayed picture coincides with the vertical size of the screen 15B of the CRT 15. This control is performed so that only an active period in which the picture is actually displayed is extracted, and all the horizontal lines in this active period are displayed over the screen 15B of the CRT 15.

Then, it proceeds to step SP12 to compute the number of horizontal lines based on the horizontal synchronizing frequency Fh and vertical synchronizing frequency Fv of the video signal S1 inputted at this time by the computation of Fh/Fv, and proceeding to the following step SP13. In step SP13, the main control part 13 determines whether or not the aspect ratio of the video signal S1 inputted at this time is 5:4 based on the number of horizontal lines and horizontal synchronizing frequency Fh of the video signal S1 inputted at this time.

That is, in the nonvolatile memory 13, criterion data of the aspect ratio based on the relationship between the number of horizontal lines and horizontal synchronizing frequency Fh of a video signal has been stored as characteristic information for classifying the video signal according to its characteristic. This criterion data is data to determine whether the aspect ratio of the input video signal S1 is 5:4 or 4:3: if the horizontal synchronizing frequency Fh of the input video signal S1 is 60.0 [kHz] or more and the number of horizontal lines is within the range from 1024 to 1100, it is determined that the aspect ratio of the above input video signal S1 is the 5:4.

Accordingly, for example, as shown in FIG. 6, if various video signals (VGA, VESA, etc.) are determined based on the above criterion data, a video signal having the 5:4 aspect ratio can be found. Thus, if the input video signal S1 has the 5:4 aspect ratio, the main control part 12 obtains an affirmative result in step SP13 of FIG. 5 and proceeds to step SP14. In step SP14, the main control part 12 reads out the data of the horizontal display size (TARGET_H_SIZE (5:4)) for obtaining the 5:4 aspect ratio, and computes the active ratio (measured ACTIVE RATIO) of the video signal S1 inputted at this time based on the result of timing measurement of the above video signal S1. This method of computation is an active ratio (ACTIVE RATIO)=t3/(tH−t4), i.e., t3/(t1+t2+t3−t4) as described above accompanying with FIGS. 4A and 4B.

If the targeted horizontal display size (TARGET H_SIZE (5:4)) and active ratio (measured ACTIVE RATIO) based on the actual measurement of the input video signal S1 are obtained in step SP14 in the above manner, the main control part 12 divides the horizontal display size (TARGET_H_SIZE (5:4)) into the active ratio (measured ACTIVE RATIO) and obtaining a value in the horizontal axis direction in FIG. 3, and a value in the vertical axis (horizontal deflection size data (H_SIZE)) which is obtained from the above value in the horizontal axis via the interpolating line L1 is obtained. This horizontal deflection size data (H_SIZE) becomes data to obtain the actual raster size (horizontal deflection size including the front porch FPH and back porch BPH) when the input video signal S1 is displayed on the screen 15B of the CRT 15 at the 5:4.

Then, the main control part 12 proceeds to step SP16 to transmit the 8-bit horizontal deflection size data (H_SIZE) obtained in step SP14 to the horizontal deflection control circuit 22 via the system bus BUS. Thereby, the horizontal deflection drive signal (horizontal deflection pulse) SDH corresponding to the above horizontal deflection size data (H_SIZE) is transmitted to the deflecting part 15A of the CRT 15, and a picture based on the video signal S1 is displayed on the screen 15B of the CRT 15 at the 5:4 aspect ratio being the aspect ratio of the input video signal S1.

Figure 7:
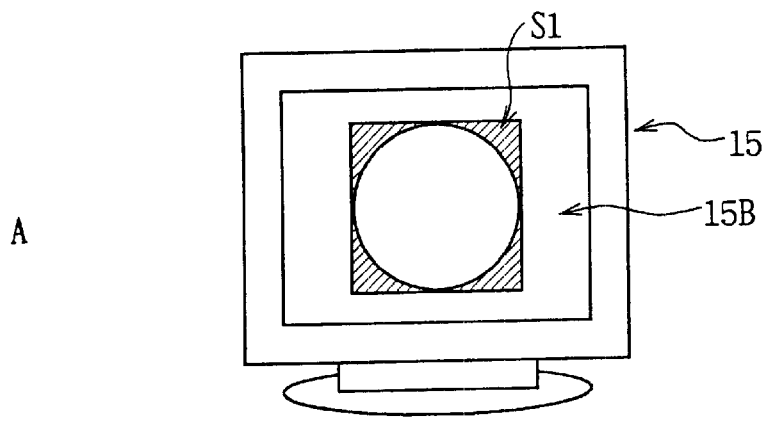
FIGS. 7A to 7C are front views showing examples of picture display on a screen.
Figure 7:
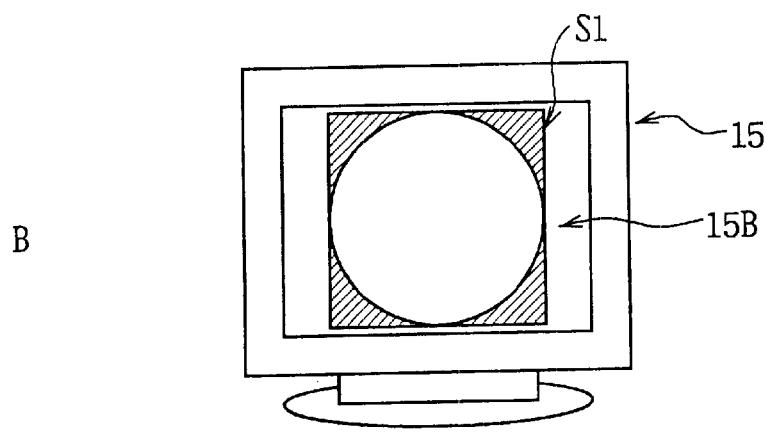
Figure 7:
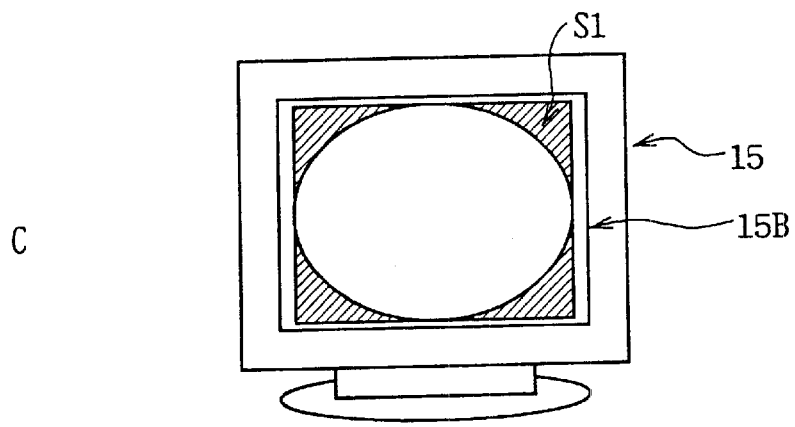

As a result, in such case as where the picture of the input video signal S1 is displayed smaller than the screen 15B of the CRT 15 as shown in FIG. 7A, if the user inputs the adjustment command with the user interface (I/F) 11 (FIG. 1), deflecting operation in which the screen 15B is effectively used is executed corresponding to the above aspect ratio while keeping the aspect ratio of the input video signal S1, as shown in FIG. 7B. Thus, as shown in FIG. 7C, a picture less distorted than the case where the picture based on the video signal S1 is displayed overall on the screen 15B of the CRT 15 can be displayed.

On the other hand, if a negative result is obtained in the aforementioned step SP13, this means that the aspect ratio of the input video signal 51 is not 5;4, that is, it is 4:3. At this time, the main control part 12 proceeds to step SP15 to read out the data of the horizontal display size (TARGET_H_SIZE (4:3)) for obtaining the 4:3 aspect ratio from the nonvolatile memory 13 as well as computing the active ratio (measured ASPECT RATIO) of the video signal S1 inputted at this time based on the result of the timing measurement of the above video signal S1. This method of computation is the active ratio (ACTIVE RATIO)=t3/(tH−t4), i.e., t3/(t1+t2+t3−t4) as described above accompanying with FIG. 4.

If the targeted horizontal display size (TARGET H_SIZE (4:3)) and the active ratio (measured ACTIVE RATIO) based on the actual measurement of the input video signal S1 are thus obtained in step SP15, the main control part 12 divides the horizontal display size (TARGET H_SIZE (4:3)) into the active ratio (measured ACTIVE RATIO), and obtaining a value in the horizontal axis direction in FIG. 3, so that a value in the vertical axis (horizontal deflection size data (H_SIZE)) which is obtained from the above value in the horizontal axis via the interpolating line L1 is obtained. This horizontal deflection size data (H_SIZE) becomes data to obtain the actual horizontal raster size (horizontal deflection size including the front porch FPH and the back porch BPH) when the input video signal S1 is displayed on the screen 15B of the CRT 15 at the 4:3.

Then, the main control part 12 proceeds to step SP16 to transmit the 8-bit horizontal deflection size data (H_SIZE) obtained in step SP15 via the system bus BUS. Thereby, the horizontal deflection drive signal (horizontal deflection pulse) SDH corresponding to the above horizontal deflection size data (H_SIZE) is transmitted to the deflecting part 15A of the CRT 15, and a picture based on the video signal S1 is displayed on the screen 15B of the CRT 15 at the 4:3 aspect ratio being the aspect ratio of the input video signal S1.

According to the above construction, the display device 10 prestores the characteristics of a video signal, for example, at the 5:4 aspect ratio (in which the horizontal synchronizing frequency Fh is 60.0 [kHz] or more and the number of horizontal lines is within the range from 1024 to 1100) among various video signals, in the nonvolatile memory 13 as criterion data, and determines whether or not the inputted video signal S1 coincides with the above criterion data in user use. And if they coincide, this signal is determined as the video signal at the 5:4 aspect ratio.

Then, when the video signal S1 at the 5:4 aspect ratio is displayed on the screen 15B of the CRT 15, the display size of the actual picture (TARGET_H_SIZE) which can most effectively use the screen 15B without changing the aspect ratio is read out from the nonvolatile memory 13 as the display size in the horizontal direction actually displayed on the screen 15B. The actual raster size (which includes the front porch FPH and back porch BPH not becoming the actual picture) settable as the above display size (TARGET_H_SIZE) is obtained from the active ratio of the video signal S1. And the horizontal deflection size data (H_SIZE) capable of obtaining the above raster size is obtained from the interpolating line L1 shown in FIG. 3.

The horizontal deflection size data (H_SIZE) thus obtained from the above interpolating line L1 is control data which satisfies the display size (TARGET_H_SIZE) actually measured in factory forwarding of the above display device 10. A picture without distortion corresponding to the aspect ratio (5:4) of the video signal S1 while adaptable to the characteristics of CRT 15 is displayed on the screen 15B by operating the horizontal deflection control circuit 22 based on this control data (FIG. 7B).

According to the above construction, the aspect ratio of an input video signal is estimated from the characteristics (horizontal synchronizing frequency and number of horizontal lines) of the input video signal, and deflecting operation adjusted to the above aspect ratio is performed, so that the screen 15B can be effectively used while avoiding the occurrence of distortion on a picture based on the video signal.

Note that, the above embodiment has dealt with the case of distinguishing an input video signal S1 having the 5:4 or 4:3 aspect ratio based on the criterion data prestored in the nonvolatile memory 13. The present invention, however, is not only limited to this but also various aspect ratios are applicable to an object to be determined such as storing criterion data for estimating the video signal of a picture having a 16:9 aspect ratio in the nonvolatile memory 13 for example.

In this case, for example, with respect to the video signal of the picture at the 16:9 aspect ratio, the characteristics such as less in the number of horizontal lines and having high horizontal synchronizing frequency, etc., may be concluded from the existent video signals and set as the criterion data.

The above embodiment has dealt with the case of storing the criterion data representing the characteristic of video signal in the nonvolatile memory 13. The present invention, however, is not only limited to this but also other various storage devices can be applied.

In the above embodiment, the present invention is applied to the display device 10 for displaying a picture on the CRT 15. The present invention, however, is not only limited to this but also is widely applicable to the case of displaying a picture on various display devices such as a liquid crystal display or the like.

Furthermore, the above embodiment has dealt with the case of displaying a picture on the screen 15B while noting its aspect ratio as kind of input video signal and properly setting the above aspect ratio. The present invention, however, is not only limited to this but also various kinds are applicable to the object to be determined of the video signal such as by specifying its resolution as kind of the input video signal and performing optimum picture display or the like.

According to the present invention as described above, since kind of an input video signal is determined based on the prestored characteristic information on video signals and the picture of the input video signal is displayed on a display means according to the characteristic information based on the above determined result, an appropriate displayed picture can be obtained corresponding to the input video signal.

INDUSTRIAL CAPABILITY

The method and device for picture display are usable, for example, to display various video signals generated or processed by computers, various in horizontal synchronizing frequency, vertical synchronizing frequency, the number of horizontal lines or the like.

What is claimed is:

1. A method for picture display, comprising:
   a first step of determining kind of an input video signal based on prestored characteristic information on video signals; and
   a second step of performing deflection control based on said determined result; and
   the method wherein the aspect ratio of said input video signal is maintained, and at least one direction of a display picture is displayed over the whole of one direction of the displayable region of a display means.

2. The method for picture display according to claim 1, wherein said first step determines the aspect ratio of said input video signal based on said characteristic information.

3. The method for picture display according to claim 2, wherein said characteristic information is the number of horizontal lines and horizontal synchronizing frequency of said input video signal.

4. The method for picture display according to claim 3, further including:
   a third step of detecting the horizontal synchronizing frequency and vertical synchronizing frequency of said input video signal; and
   a fourth step of computing the number of lines from said detected horizontal synchronizing frequency and vertical synchronizing frequency; and
   said method wherein the aspect ratio of said input video signal is determined based on said computed number of lines, said detected horizontal synchronizing frequency and said prestored characteristic information.

5. The method for picture display according to claim 2, further including:
   a fifth step of prestoring related data on a deflection parameter and a value relevant to a display size;
   a sixth step of storing a value relevant to the display size when at least one direction of the display picture is displayed over the whole of one direction of the displayable region of the display means with respect to video signals having plural aspect ratios;
   a seventh step of reading out a value relevant to said stored display size corresponding to said determined aspect ratio; and
   an eighth step of computing said stored relevant data and a deflection parameter based on said read-out data.

6. The method for picture display according to claim 5, wherein:
   in said first step, a horizontal deflection parameter and related data on the ratio of an active ratio to an actual horizontal display size are prestored;
   in said sixth step, a horizontal display size when the horizontal direction of the display picture is displayed over the whole of the horizontal direction of the displayable region of the display means is stored with respect to the video signals having plural aspect ratios;
   in said seventh step, said stored horizontal display size corresponding to the determined aspect ratio is read out; and in said eighth step, a deflection parameter is computed based on said stored related data and said read-out horizontal display size.

7. The method for picture display according to claim 6, wherein said active ratio is the ratio of the period of an effective video signal to one horizontal period.

8. A picture display device, comprising:
   a storage means for prestoring the characteristic information on a video signal;
   a detection means for detecting the horizontal and vertical synchronizing frequencies of the input video signal;
   a determination means for determining kind of said input video signal based on said detected horizontal and vertical synchronizing frequencies and said stored characteristic information; and
   a control means for controlling a deflecting circuit based on said determined result; and
   the picture display device wherein the aspect ratio of said input video signal is maintained, and at least one direction of a display picture is displayed over the whole of one direction of the displayable region of a display means.

9. The picture display device according to claim 8, wherein said determination means determines the aspect ratio of said input video signal based on said characteristic information.

10. The picture display device according to claim 9, wherein said characteristic information is the number of horizontal lines and horizontal synchronizing frequency of said input video signal.

11. The picture display device according to claim 10, including;
   a first computing means for computing the number of lines from said detected horizontal synchronizing frequency and vertical synchronizing frequency; and
   the picture display device wherein the aspect ratio of said input video signal is determined based on said computed number of lines, said detected horizontal synchronizing frequency and said stored characteristic information.

12. The picture display device according to claim 2, wherein said storage means further stores related data on a deflection parameter and a value relevant to a display size, and prestores a value relevant to a display size when at least one direction of the display picture is displayed over the whole of one direction of the displayable region of the display means with respect to the video signals having plural aspect ratios, and
   the picture display device further including:
   a readout means for reading out said stored value relevant to the display size and said related data corresponding to said determined aspect ratio; and
   a second computing means for computing the deflection parameter based on said read-out related data and said read-out value.

13. The picture display device according to claim 12, wherein:
   said storage means prestores the relationship between the horizontal deflection parameter and the ratio of an active ratio to the actual horizontal display size, and also prestores a horizontal display size when the horizontal direction of the display picture is displayed over the whole of the horizontal direction of the displayable region of the display means with respect to the video signals having the plural aspect ratios;
   said readout means reads out said stored horizontal display size corresponding to said determined aspect ratio; and
   said second computing means computes the deflection parameter based on said stored related data and said read-out horizontal display size.

14. The picture display device according to claim 13, wherein said active ratio is the ratio of the period of an effective video signal to one horizontal periods.

* * * * *